May 16, 1961 F. KRAHULEC 2,984,536

SYSTEM AND APPARATUS FOR RECORDING THE LISTENING HABITS OF WAVE SIGNAL RECEIVER USERS

Original Filed March 2, 1950

5 Sheets-Sheet 1

INVENTOR
Fred Krahulec

By
Mason, Kolehmainen, Rathburn & Wyss - Att'ys

INVENTOR
Fred Krahulec
By
Mason, Kolehmainen, Rathburn & Wyss - Att'ys

May 16, 1961 F. KRAHULEC 2,984,536

SYSTEM AND APPARATUS FOR RECORDING THE LISTENING HABITS OF WAVE SIGNAL RECEIVER USERS

Original Filed March 2, 1950

5 Sheets-Sheet 3

INVENTOR
Fred Krahulec
BY
Mason, Kolehmainen, Rathburn & Wyss - Att'ys

INVENTOR
Fred Krahulec
By
Mason, Kolehmainen, Rathburn & Wyss - Att'ys

May 16, 1961 F. KRAHULEC 2,984,536

SYSTEM AND APPARATUS FOR RECORDING THE LISTENING HABITS OF WAVE SIGNAL RECEIVER USERS

Original Filed March 2, 1950

5 Sheets-Sheet 5

INVENTOR
Fred Krahulec
By
Mason, Kolehmainen, Rathburn & Wyss Att'ys 2,984,536

SYSTEM AND APPARATUS FOR RECORDING THE LISTENING HABITS OF WAVE SIGNAL RECEIVER USERS

Fred Krahulec, Skokie, Ill., assignor to A. C. Nielson Company, a corporation of Delaware Original application Mar. 2, 1950, Ser. No. 147,302, now Patent No. 2,838,359, dated June 10, 1958. Divided and this application Apr. 8, 1957, Ser. No. 651,257

3 Claims. (Cl. 346—108)

The present invention relates to an apparatus for recording the listening habits, or viewing habits in the case of television, of wave signal receiver users. Specifically, this application is a division of a prior application, Serial No. 147,302, filed March 2, 1950, now Patent No. 2,838,359.

Instrumented methods of determining the listening habits, or viewing habits in the case of television, of wave signal receiver users generally employ a recording device operating in conjunction with one or more receivers in the home of each collaborator to record as a function of time the wave signal transmitters to which the receiver is tuned for signal reception, whereupon this recorded information is made available to an anlysis or research organization for conversion to useable data with reference to radio advertising and the like. The collaborator homes are chosen on a nationwide basis so as to be truly representative of the radio and television audiences throughout the area under consideration as, for example, the entire United States. The usual device of this character embodies facilities for driving a recording element such as a recording tape or the like at a constant speed and recording on this tape the various stations to which the receiver is tuned. In one recording arrangement extensively used heretofore the position of the record indications transversely of the tape are representative of the particular stations to which the associated receiver or receivers are tuned.

For the purpose of eliminating a substantial cost factor in the sampling process of getting the recorded information to the analysis organization at regular and frequent intervals, it has been suggested to employ mailable magazines containing the recording or record receiving element which magazines can readily be associated with or removed from the recorder by the collaborator in whose home the receiver or receivers to be monitored are located. By having the collaborator replace the magazines and mail them directly to the analysis organization a substantial cost reduction is occasioned, since fewer field men are required and hence their salaries and expenses are effectively reduced, particularly when such recording devices are disposed in widely scattered areas. As has been pointed out in co-pending Rahmel application, Serial No. 762,962, filed July 23, 1947 (now Patent No. 2,660,508), and assigned to the same assignee as the present application, where mailable magazines are employed, it is essential that some independent and more or less foolproof time information be applied to the record while it is being made, which time information will permit the analysis organization accurately to orientate the record with respect to a predetermined calendar period.

It would be desirable to provide an improved recording device and apparatus for recording the desired record information in a manner which lends itself more completely to automatic operation from the standpoint of converting the recorded data to a final statistical analysis. Such automatic operation might comprise among other things automatic devices for converting information recorded on the recording or record receiving element to information which can be directly fed to an electronic digital computer or similar apparatus. It would furthermore be desirable to supply the record information to the recording element in a manner such that it may also be read with speed and ease with conventional means. Conventionally the position of the record traces transversely of the recording element has been directly indicative of the particular station to which the receiver is tuned. It will be apparent that having record indications transversely of a record receiving element or tape, the positions of which are directly indicative of the station to which the receiver is tuned, does not lend itself readily to high speed automatic reading. Accordingly, it would be desirable to provide an arrangement of recording such information which would more readily lend itself to automatic decoding.

It is an object of the present invention to provide a new and improved apparatus for recording the listening or viewing habits of wave signal receiver users.

It is another object of the present invention to provide a recording device of the type referred to above which includes a new and improved optical scanning system.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Figs. 1*a*, 1*b* and 1*c* together are a circuit diagram of a recording apparatus embodying the present invention;

Figure 1A:
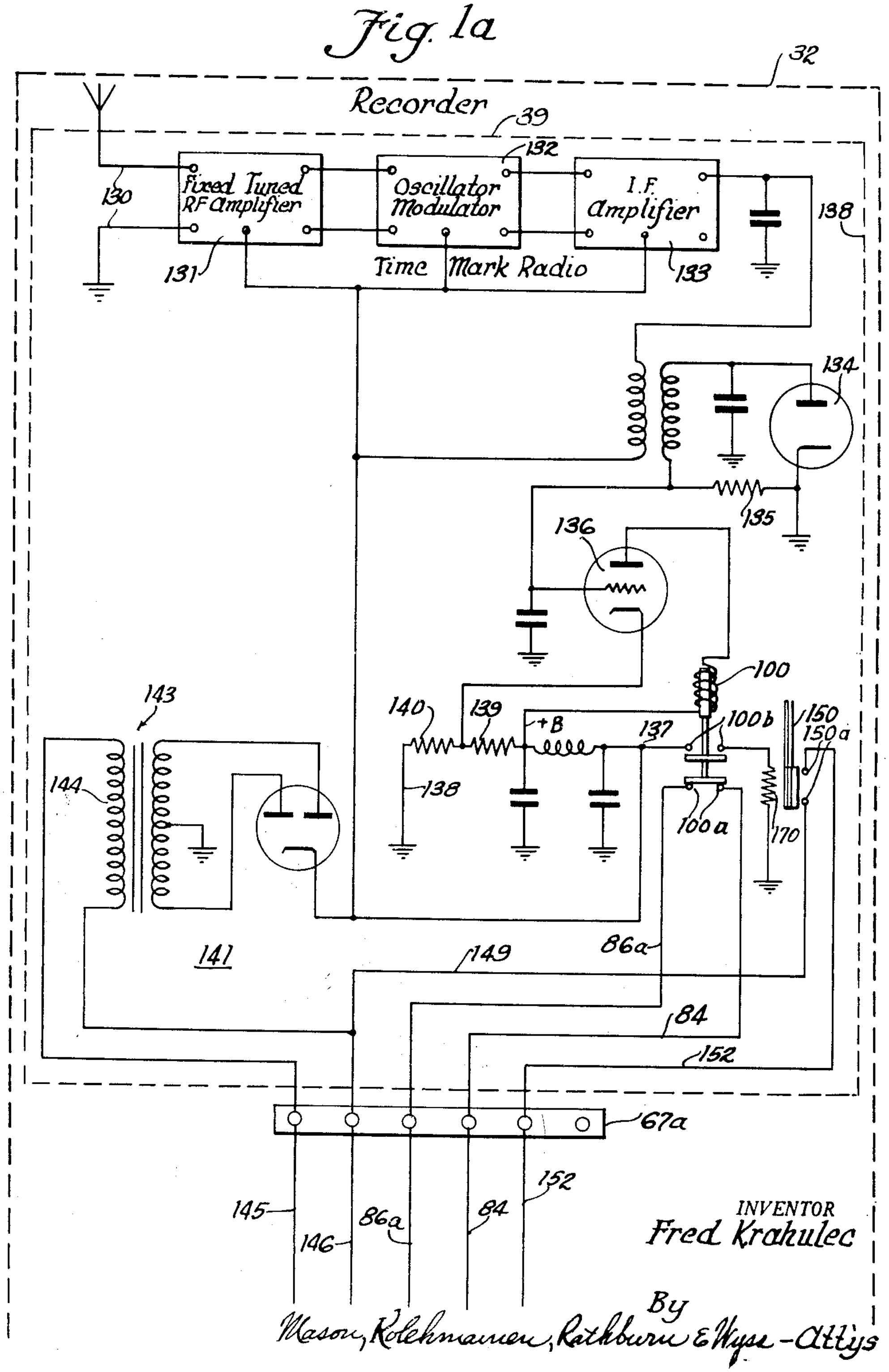
Figure 1B:
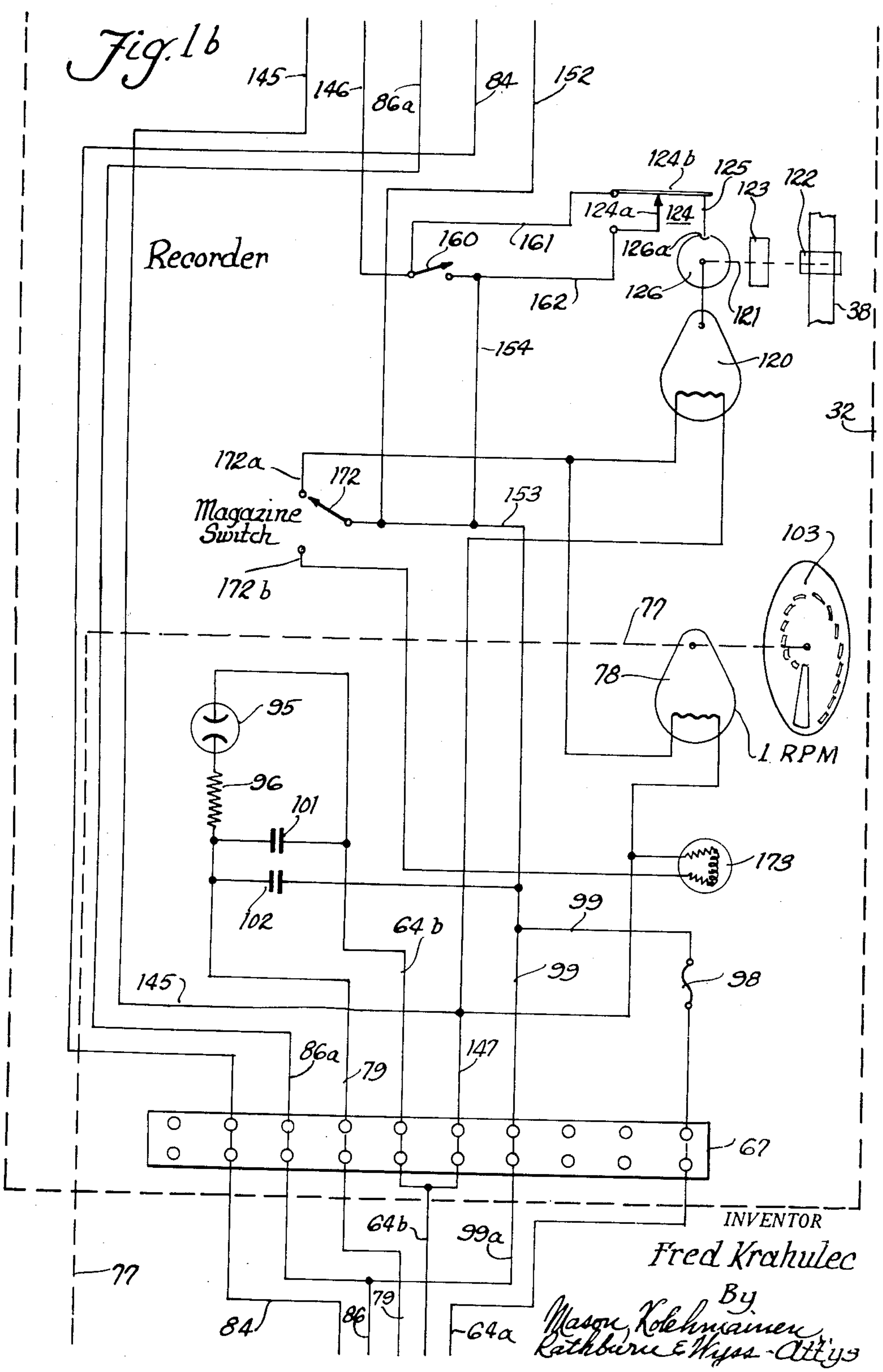
Figure 1C:
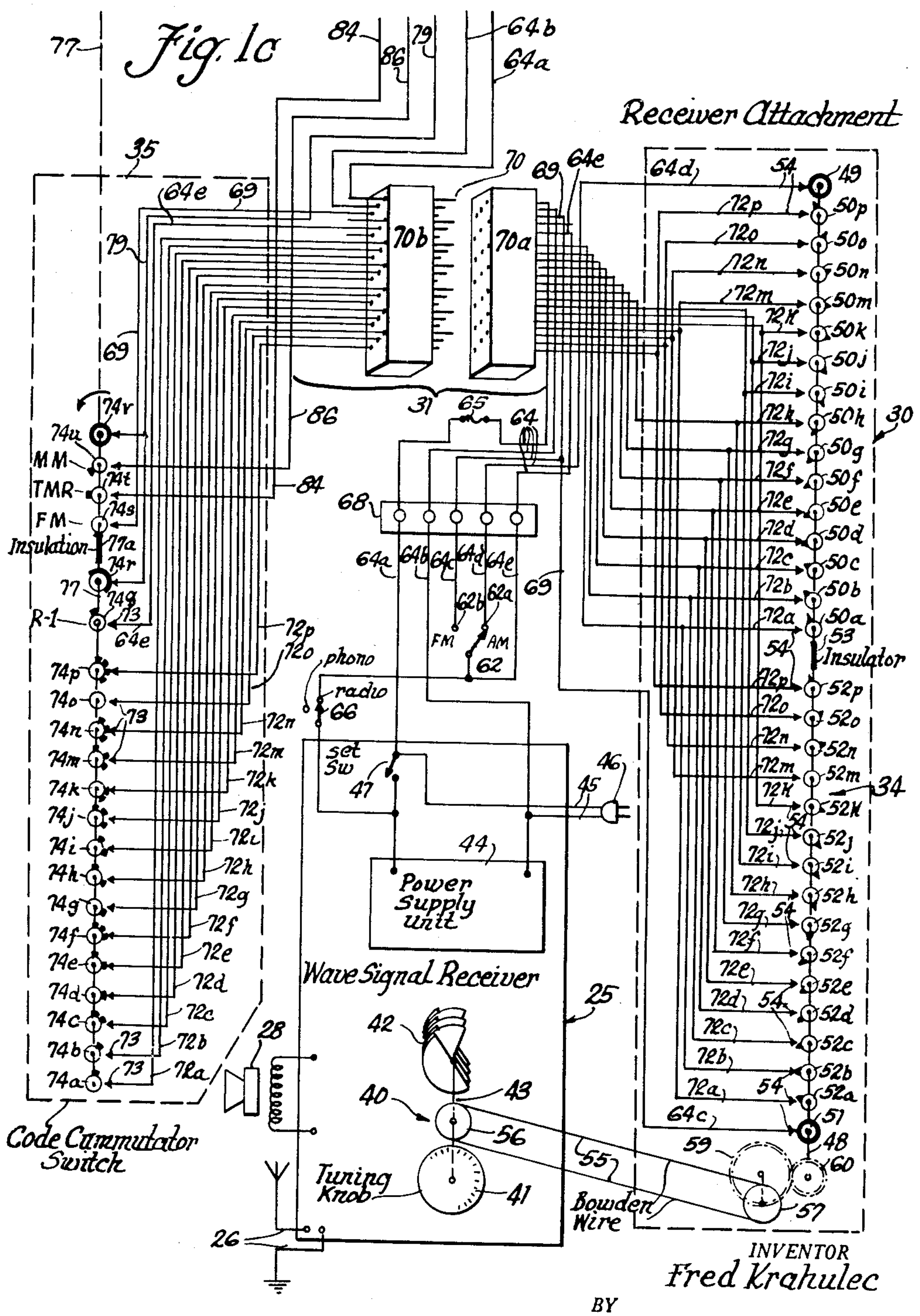

It will be understood from the following description that various features of the present invention are applicable to various systems and apparatus employed heretofore for determining the listening or viewing habits of a radio or television audience. For the purpose of fully disclosing the present invention it has been illustrated as applied to a particular type of system in which the recording apparatus is generally disposed in a position not too far removed from the wave signal receiver being monitored. As illustrated a cable connection between the monitored receiver and the recording apparatus is provided. However, the features of the invention are applicable to systems in which the recording device is disposed remotely from the receiver. For example, the recording device may be located in a room of the collaborator's home far removed from the room where the receiver being monitored is located. The recorder might, for example, be located in the closet or basement of the home while one or more receivers to be monitored are located in various rooms of this home. The connection between the recorder and the monitored receiver may be by space link, power lines or the like. Considering first the system as a whole as schematically illustrated in Figs. 1*a*, 1*b* and 1*c* taken together, and wherein the same reference numerals are employed for corresponding parts as in the structural views of the drawings, there is illustrated schematically a wave signal receiver generally designated at 25, the tuning condition of which it is desired to monitor. In other words information is desired as to the pass bands or channels to which the receiver 25 is tuned with respect to time and as is described hereinafter a continuous record of such tuning conditions with respect to time is made.

The receiver 25 may be any type of receiver whether it be for amplitude modulated or frequency modulated program signals, or both, or whether the signals are eventually converted to visible or audible form or both. As illustrated the wave signal receiver 25 is schematically indicated as comprising an antenna-ground circuit 26, and a signal reproducer schematically designated as a loud speaker 28. It will be understood that the signal reproducer 28 might equally well comprise a fluorescent screen of similar apparatus. Interposed between the antenna-ground circuit 26, and the signal reproducer 28 are of course the usual stages of a wave signal receiver not shown, which might comprise a tunable radio frequency amplifier, a mixer or modulator, and in the case of a conventional radio receiver, an audio frequency amplifier and the like. Since the receiver 25 is representative of any conventional wave signal receiver whether it be a radio receiver or a television receiver its mode of operation will be readily apparent to those skilled in the art and consequently no further discussion thereof is included in this application.

Figures 2, 3:
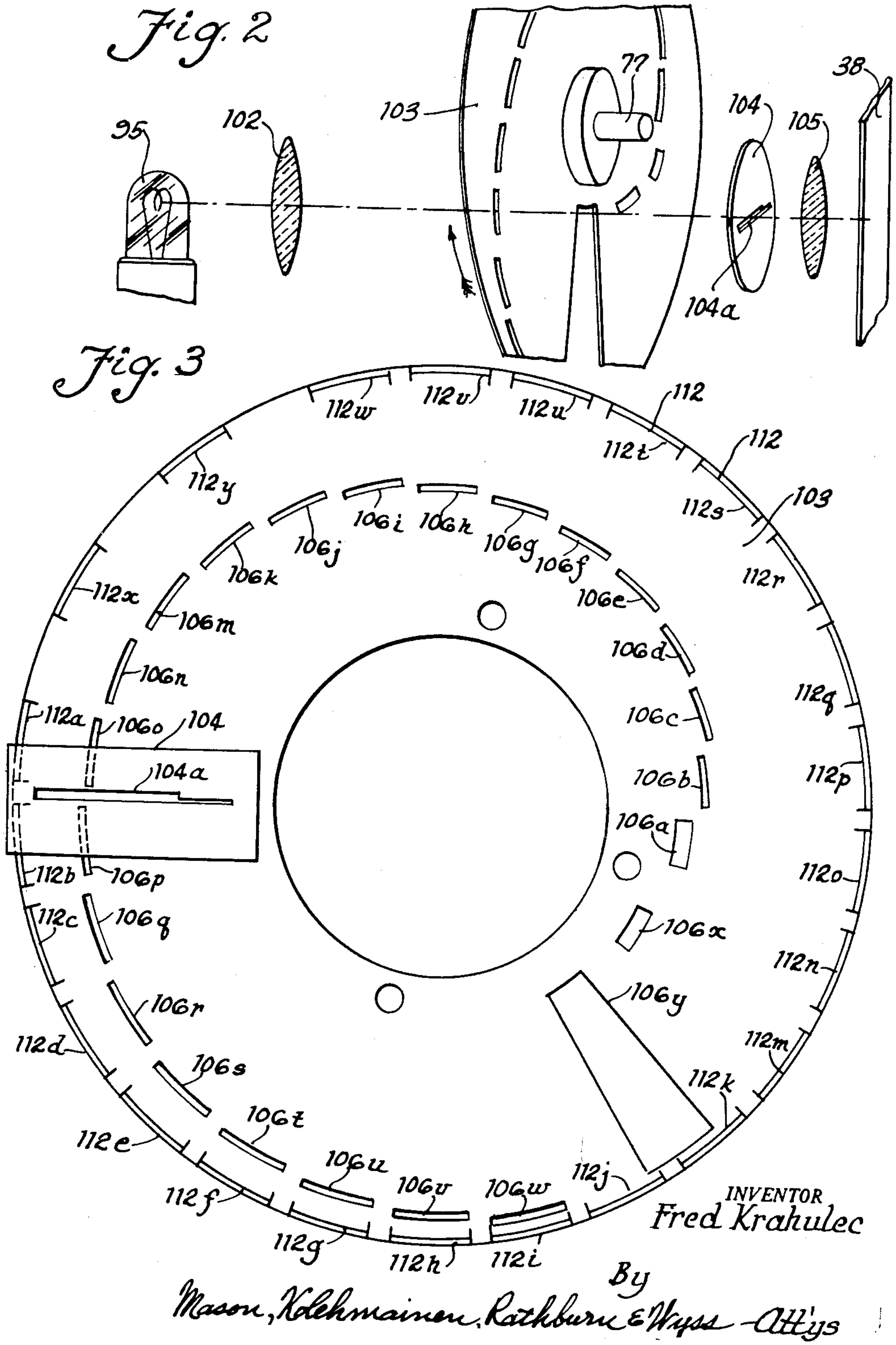
Fig. 2 is an enlarged somewhat schematic diagram of an optical system in the recording apparatus.
Fig. 3 is an enlarged view of two elements of the optical system shown in Fig. 2 viewed from the side opposite the one in which the record receiving element is disposed.

The system and apparatus for recording the listening or viewing habits of wave signal receiver users shown in Figs. 1*a*, 1*b* and 1*c*, when combined as a unit, essentially comprises, in addition to the wave signal receiver 25 which is to be monitored, a receiver attachment generally designated at 30 suitably connected with the wave signal receiver 25, and a link generally designated at 31 connecting the receiver 25 and receiver attachment 30 with a suitable recording device generally designated at 32 and structurally disclosed in Fig. 2 of the drawings. The link 31 is illustrated as a cable connected link, but might equally well comprise some other link such as a space link, a telemeter link or the like.

The essential elements of the receiver attachment and recorder described in greater detail hereinafter comprise a position switch 34 located at the receiver attachment 30, a code commutator switch 35, located either at the recorder or the receiver attachment depending upon the type of link 31 employed, a mailable magazine adapted to be disposed in a magazine receptacle in the recorder 32, a record receiving element or film 38 together with means for producing record indications thereon as well as means for moving this element into the mailable magazine after record indications are produced thereon, a time mark radio 39, and assorted elements described in detail hereinafter.

The recorder 32 includes means for recording on the record receiving element 38 the tuning condition of one or more wave signal receivers such as 25 and also suitable time information whereby it is readily possible for the analysis organization to analyze the records from a selected group of wave signal receivers, representative of the listening or viewing audiences of wave signal receivers, whereby a statistical analysis may be arrived at with reference to the listening habits of wave signal receiver users. By this means the effectiveness of radio or television advertising or both may be determined with considerable accuracy.

Wave signal receivers generally include some tuning apparatus and for wave signal receiver 25 this is schematically designated at 40 in Fig. 1*c* of the drawings, comprising a tuning knob 41 and a resonant frequency varying device 42 drivingly interconnected by a tuning shaft 43. The receiver 25 also includes a power supply unit schematically designated at 44 which is adapted to be connected to a suitable power outlet by a conventional power cord 45 having at the end thereof a conventional plug connector 46. The energization of the wave signal receiver 25 is conventionally controlled by a suitable switch 47 often referred to as the set switch which generally is combined with the manual volume control means.

It will be apparent to those skilled in the art that there must be obtained from the wave signal receiver being monitored, such as 25, a response of some sort indicative of the tuning condition of the receiver. This response might be an electrical response of some sort. For example, if a superheterodyne receiver is being monitored, it will be understood that the output of the local oscillator will vary in frequency with changes in tuning so as to be indicative of the pass band to which the receiver is tuned. The physical position of the resonant frequency varying means 42 or in other words the position of the tuning shaft 43 is of course also clearly indicative of the tuning condition of the receiver, and these variations in positioning of the tuning shaft 43 might be designated as a "mechanical response." Since 85% to 90% of the wave signal receivers available on the market today permit of readily obtaining a "mechanical response" indicative of the tuning condition of the receiver, the present invention has been illustrated with an arrangement for utilizing such a "mechanical response."

For the purpose of converting the tuning position of the receiver 25 to a readily transmittable indication such as an electrical signal, there is provided in the receiver attachment 30 the position switch 34, which preferably is of the form disclosed and claimed in co-pending Krahulec application Serial No. 78,921, filed March 1, 1949 (now Patent No. 2,658,963), and assigned to the same assignee as the present application. Essentially the position switch 34 comprises a rotary conducting shaft 48 to which are attached a plurality of regularly spaced contact cams 49, 50, 51 and 52. The cams 49 and 50 are designated as the AM group of cams, while the cams 51 and 52 are designated as the FM cams and are electrically isolated by virtue of an insulated section 53 of the shaft 48 which separates the cams into two groups. The AM group are employed for producing signals indicative of the receiver 25 being tuned to stations in the standard broadcast band, while the FM group are for frequency modulation transmitters including television transmitters. As illustrated, there are fifteen cams 50 and fifteen cams 52 designated specifically as 50*a*, 50*b*, 50*c*, 50*d*, 50*e*, 50*f*, 50*g*, 50*h*, 50*i*, 50*j*, 50*k*, 50*m*, 50*n*, 50*o*, 50*p*, 52*a*, 52*b*, 52*c*, 52*d*, 52*e*, 52*f*, 52*g*, 52*h*, 52*i*, 52*j*, 52*k*, 52*m*, 52*n*, 52*o*, and 52*p*. As is fully disclosed in the above-mentioned co-pending Krahulec application Serial No. 78,921, the cams 50 and 42 are each provided with a raised cam surface adapted when in a predetermined angular position to engage with their associated relatively stationary contacts generally designated at 54.

In order that the position of the shaft 48 of the rotary position switch 34 may be correlated with the position of the tuning shaft 43 of the receiver 25, there is provided a suitable mechanical link interconnecting the shafts 43 and 48, which in the main preferably comprises a pair of Bowden wires 55, the ends of which are preferably wrapped around the respective shafts 43 and 48 or around suitable pulleys such as 56 and 57 associated with these shafts. As illustrated, the pulley 56 is mounted on the shaft 43 while the pulley 57 is drivingly connected with the position switch shaft 48 through a pair of gear members 59 and 60.

The cams 50 and 52 may be angularly adjusted with respect to the shaft 48 so as to engage their associated contacts 53 in any desired predetermined sequence. Preferably the position switch 34 embodies the features disclosed and broadly claimed in Rahmel Patent 2,484,734 assigned to the same assignee as the instant application. The cams 50 are adjusted to different angular positions on the shaft 48 as illustrated, each cam engaging its associated contact 54 when the tuning shaft 43 of the receiver 25 is tuned to a particular transmitter in the standard broadcast band refered to as AM transmitters. Similarly the cams 52 are also adjusted to different angular positions so that a particular cam will engage its associated contact 54 when the receiver 25 is tuned to a particular frequency modulation or television transmitting station. As illustrated the position switch 34 may be used to convert the tuning positions of the tuning shaft 43 to control impulses for thirty different transmitters, including fifteen AM transmitters and fifteen FM and television transmitters. This is usually ample for any receiver and the channels chosen are those to which the receiver 25 is likely to be tuned. Obviously if the receiver does not receive FM signals then all thirty cams 50 and 52 may be used for indicating tuning to transmitters in the standard broadcast band. As a practical matter more than fifteen channels in the standard broadcast band are very unlikely to be required since in most cases the radio audience in any home concentrates on a relatively few transmitting stations.

It will be understood by those skilled in the art that in conventional wave signal receivers where combination frequency modulation and amplitude modulation signals are receivable, that the receiver usually comprises two separate circuits selectively rendered effective by a band switch or the like but utilizing the same tuning shaft. It therefore becomes necessary selectively to render the AM group of cams 50 or FM group of cams 52 of the position switch 34 effective in dependence upon the position of the band switch of the receiver 25. To this end a suitable switch 62 is connected to be operated to engage its AM contact 62*a* or its FM contact 62*b* in dependence upon the corresponding position of the band switch, not shown, of the receiver 25.

For the purpose of supplying power to the receiver attachment 30 and also through the link 31 to the recorder 32 the receiver attachment is electrically connected to the receiver 25 by a plurality of conductors, specifically five in number, designated by the reference numeral 64 and specifically as 64*a*, 64*b*, 64*c*, 64*d*, and 64*e*. The conductors 64*a* and 64*b* supply power from the power supply unit 44 of the receiver 25 (so long as the plug connector 46 is connected to a power source whether or not the set switch 47 is closed) to the recorder 32 through a fuse 65 and the link 31. The conductors 64*a* and 64*b* may be traced in Figs. 1*b* and 1*c* of the drawings as leading to the terminal strip 67 of the recorder 32.

In order to distinguish between phonograph operation and radio operation of the receiver 25, in the event the receiver 25 is of the so-called "console" type, a switch 66 is provided which is closed when the receiver 25 is used as a radio and open when the receiver 25 is operated as a phonograph. One end of the conductor 64*e* is connected to one side of the power supply unit 44 of the receiver 25 through the switch 66 while the other end of the conductor 64*e* is connected to the code commutator switch 35, through the link 31. The set switch 47 must be closed before current can flow through the conductor 64*e* and consequently this conductor carries a signal indicative of the "on" or "off" condition of the receiver 25. With this connection it is possible to distinguish phonograph listening from other listening or viewing, as far as the record produced by the recorder 32 is concerned. The contacts 62*a* and 62*b* of the switch 62 which is connected to the power supply unit 44 through the switch 66 are respectively connected through the conductors 64*d* and 64*c* to the contacts 54 associated with the cams 49 and 51, respectively, thereby rendering the AM section or the FM section of the position switch 34 effective in dependence upon the position of the switch 62 and consequently the position of the band switch, not shown, of the receiver 25. The cams 49 and 51 make continuous contact with their associated contacts 54 regardless of the position of the shaft 48. The conductor 64*c* which is effectively the FM conductor is also connected to the code commutator switch 35 through the link 31 by means of a conductor 69, whereby an impulse is produced for record purposes when the receiver 25 is tuned for FM or television reception to distinguish this tuning from tuning to transmitters in the standard broadcast band.

In order to simplify the installation, the link 31 comprises two sections, one associated with the receiver attachment 30 and the other with the recorder 32 or the code commutator switch 35. These sections are interconnected by a two-part multiconductor plug connector generally designated at 70, comprising a female portion 70*a* and a male portion 70*b*. This type of connector is often referred to as a "Jones plug" and, as illustrated, is adapted to accommodate twenty-one conductors although in the illustrated embodiment only 19 conductors are used. Fifteen of these nineteen conductors connected to corresponding contacts on both parts of the connector 70 are designated as 72*a*, 72*b*, 72*c*, 72*d*, 72*e*, 72*f*, 72*g*, 72*h*, 72*i*, 72*j*, 72*k*, 72*m*, 72*n*, 72*o*, and 72*p*. These conductors effectively interconnect through the connector 70 contacts 54 associated with the cams 50 and 52 with similar contacts 73 of the code commutator switch 35, the individual conductors 72 being connected to the particular contacts 54 associated with the particular cams 50 and 52 having identical subscripts with the subscripts of the conductors 72. In other words, the conductor 72*a* is connected to the cam means 50*a* and 52*a* through the associated contacts 54, the conductor 72*b* is connected to the cam means 50*b* and 52*b* through the associated contacts 54, etc. The remaining four conductors connected to four other contacts of the plug connector 70 are the conductors 64*a*, 64*b*, 64*e*, and 69 discussed above.

With the above described arrangement the receiver attachment 30 which is a very small and compact device may readily be associated with the wave signal receiver 25. When initially installing the device, the mechanical Bowden wire connection described above must be made and the switches 62 and 66 must be attached to the band switch and phonograph switch, respectively, of the receiver 25. Preferably the electrical connections embodying the conductors 64 are made to a terminal strip 68 at the receiver attachment, and the connections to the receiver 25 from this terminal strip 68 must be made. In the great majority of the receivers disposed in homes throughout the United States, the receiver attachment can be disposed within available cabinet space of the receiver or attached to the back thereof.

Figure 4:
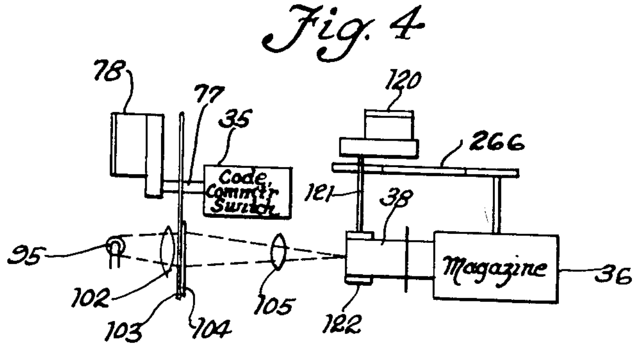
Figs. 4 and 5 are respectively schematic top and side view diagrams indicating the relationship of the components of the optical system with respect to additional parts of the recorder.

After the receiver attachment 30 is properly associated with the receiver 25, as shown in Fig. 1*c* of the drawings, to complete the installation it is then merely necessary to connect the recorder unit 32 to be described in detail hereinafter with which the plug portion 70*b* of the plug connector 70 is associated to the female connector portion 70*a*. The cable connected to the plug portion 70*b* is of such length as to permit disposition of the recorder 32 in any desired position. When such a cable is employed it is generally desirable to locate the recorder 32 adjacent the receiver, as, for example, within an end table or a suitable cabinet disposed near the receiver 25. The reason for this is obvious, since it is generally undesirable to have a substantial length of cable extending between the receiver attachment and the recorder, and as a rule the collaborator would object. Where remote positioning of the receiver attachment 30 and the recorder 32 is desirable, the cable interconnecting the two and designated as the link 31 in Fig. 1*c* of the drawings is dispensed with and another type of link such as a space link or a link employing the power lines as a carrier for the signals may be substituted. Also in the latter case the code commutator switch 35 normally associated with the recorder 32, as is best shown in Fig. 4 of the drawings, is associated with the receiver attachment thereby dispensing with the large number of conductors between the recorder and the position switch which are necessary to interrelate the position switch 34 and the code commutator switch 35.

For the purpose of converting the electrical response of the position switch 34 indicative of the position of the tuning shaft 43 to a readily recordable and decodable response, the code commutator switch 35 referred to above is provided. This code commutator switch 35 is schematically indicated in Fig. 1*c* of the drawings and is preferably a specific one of the rotary switches disclosed in the above mentioned Krahulec application, Serial No. 78,921 consisting of a group of wiper springs which comprise the contacts 73 referred to above arranged to make contact with raised portions 75 comprising a code pattern engraved on a conducting drum 76 best shown in Fig. 4 of the drawings. The angular position of the drum 76 determines the particular code produced by the code commutator switch 35. The code commutator switch might equally well comprise a plurality of individual cams corresponding to the raised portions 75 associated with each of the wiper contacts 73, and this arrangement is illustrated in Fig. 1*c* of the drawings since it lends itself better to schematic illustration. As illustrated in Fig. 1*c* this code commutator switch comprises a plurality of cams 74*a*, 74*b*, 74*c*, 74*d*, 74*e*, 74*f*, 74*g*, 74*h*, 74*i*, 74*j*, 74*k*, 74*m*, 74*n*, 74*o*, 74*p*, 74*q*, 74*r*, 74*s*, 74*t*, 74*u*, and 74*v* which have raised contact portions equivalent to the portions 75 engraved on the drum 76. These cams are illustrated as being mounted on a shaft 77 having an insulated section 77*a* so as electrically to isolate the cams 74*s*, 74*t*, 74*u* and 74*v* from the remaining cams 74. As illustrated the shaft 77 is adapted to be rotated preferably at one revolution per minute by a suitable synchronous motor and gear train unit 78 shown in Fig. 1*b* of the drawings. The synchronous motor 78 forms a part of the recorder unit 32 and is drivingly connected to the code commutator switch 35. Where the cable connected arrangement cannot be employed and the code commutator switch 35 is associated with the receiver attachment 30 a synchronous driving motor such as 78 must be disposed at the receiver attachment. It will be apparent that the drum 75 and consequently the cams 74 are capable of assuming a large number of angular positions and in a particular embodiment which has been successfully built and tested twenty-six angular positions of the code commutator switch 35 may be employed for producing coding pulses.

In order to record readily decodable record indications of the channels to which a plurality of receivers such as 25 may be tuned, across a single record receiving element 38 which, for example, might comprise a sixteen millimeter film, it was decided to employ a "binary code" which was found to be especially satisfactory and lends itself to high speed decoding. By employing such a binary code only four angular positions of the code commutator switch need be used to code fifteen separate tuning channels. To this end the cams 74*a*, 74*b*, 74*c*, 74*d*, 74*e*, 74*f*, 74*g*, 74*h*, 74*i*, 74*j*, 74*k*, 74*m*, 74*n*, 74*o*, and 74*p* are provided with various combinations of raised contact portions all confined within four angular positions of the shaft 77. Cam 74*a* is provided with a single raised contact portion in a first of these four positions; cam 74*b* is provided with a single raised contact portion in a second of these angular positions; cam 74*c* is provided with two raised contact portions, one in the first angular position and one in the second angular position; etc. As illustrated in the drawings the combination of raised contact portions in only four angular cam positions to produce fifteen different code combinations is tabulated in the following table:

| Station No. | Cam | Raised Contact Portion in the Following Position or Positions |
|---|---|---|
| 1 | 74*a* | 1 |
| 2 | 74*b* | 2 |
| 3 | 74*c* | 1—2 |
| 4 | 74*d* | 3 |
| 5 | 74*e* | 1—3 |
| 6 | 74*f* | 2—3 |
| 7 | 74*g* | 1—2—3 |
| 8 | 74*h* | 4 |
| 9 | 74*i* | 1—4 |
| 10 | 74*j* | 2—4 |
| 11 | 74*k* | 1—2—4 |
| 12 | 74*m* | 3—4 |
| 13 | 74*n* | 1—3—4 |
| 14 | 74*o* | 2—3—4 |
| 15 | 74*p* | 1—2—3—4 |

Figures 5, 6:
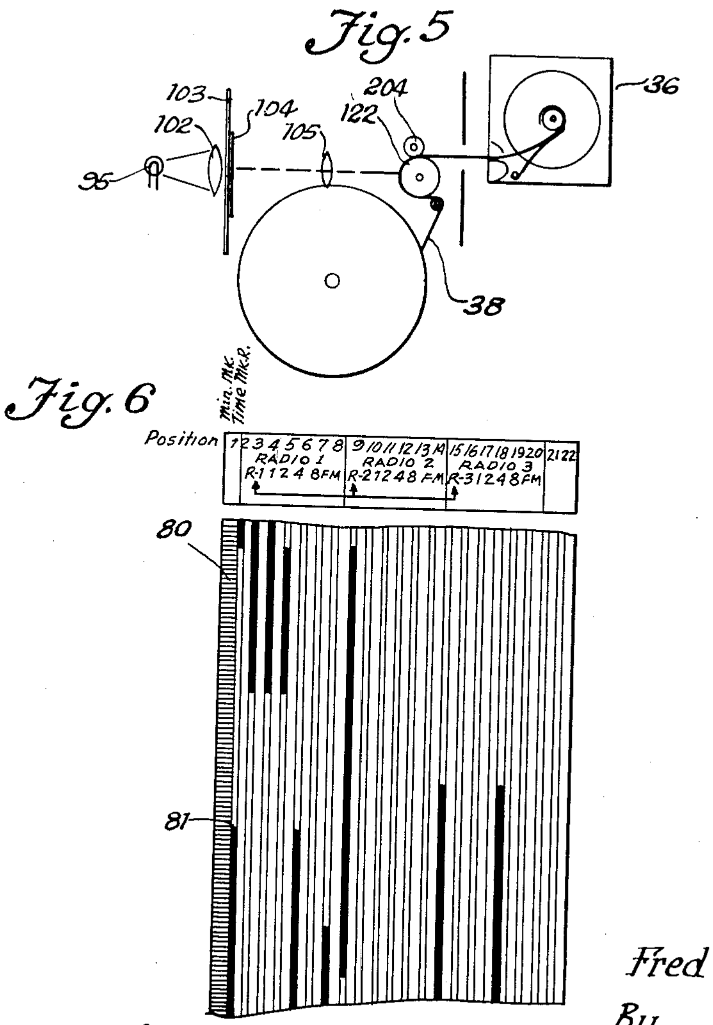
Fig. 6 is an enlarged fragmentary view of a record strip employed in the recorder with respresentative record indations shown thereon to aid in understanding the present invention.

The binary code type of basic record which requires only four positions across a record receiving element to record fifteen separate tuning channels can best be understood by reference to Fig. 6 of the drawings where the record receiving element 38 is indicated as comprising twenty-two transverse positions in which record indications may be produced. Four positions on this element 38 for coding fifteen channels comprise the positions 4, 5, 6 and 7. The first of these, namely position 4, is assigned a code of one, the second, namely position 5, is assigned a code of two, the third, namely position 6, is assigned a code of four, and the fourth, namely position 7, is assigned a code of eight. The presence or absence of code marks in these four positions will permit of fifteen different combinations with each combination equal to the sum of the code numbers with which code marks are associated. The number of the station to which the receiver 25 is tuned is determined by the sum of code numbers associated with the respective positions on the element 38 in which code marks are produced. If code marks appear in a line across the element 38 only in positions 4 and 7 assigned code numbers one and eight, the station to which the receiver 25 is tuned is station number nine. For fifteen stations this may be tabulated as follows:

| Station Number to Which Receiver 25 Is Tuned | Code Number or Numbers of Positions on Element 38 in Which a Code Mark Appears |
|---|---|
| 1 | 1. |
| 2 | 2. |
| 3 | 1 and 2. |
| 4 | 4. |
| 5 | 1 and 4. |
| 6 | 2 and 4. |
| 7 | 1, 2 and 4. |
| 8 | 8. |
| 9 | 1 and 8. |
| 10 | 2 and 8. |
| 11 | 1, 2 and 8. |
| 12 | 4 and 8. |
| 13 | 1, 4 and 8. |
| 14 | 2, 4 and 8. |
| 15 | 1, 2, 4 and 8. |

Thus by using four positions on the recording element 38, fifteen separate channels can be recorded for any particular receiver and an additional channel can be employed to indicate whether or not the receiver is turned on or not so as to afford information as to whether the receiver is tuned to stations other than the fifteen channels for which record indications are available. It is understood that if the recorded information indicates that the receiver is tuned for a substantial portion of time to stations other than the fifteen channels provided, that some of these other stations should be included in the fifteen channels. Otherwise a significant amount of listening or viewing is not recorded.

The resilient contacts 73 associated with the cams 74*a*, 74*b*, 74*c*, 74*d*, 74*e*, 74*f*, 74*g*, 74*h*, 74*i*, 74*j*, 74*k*, 74*m*, 74n, 74o, and 74p are connected to conductors 72a, 72b, 72c, 72d, 72e, 72f, 72g, 72h, 72i, 72j, 72k, 72m, 72n, 72o and 72p, respectively, whereby a particular position of the position switch 34 will render a corresponding particular coding cam effective.

The cam 74r is a wiper cam so as to complete the electrical circuit to a suitable control device associated with the recorder 32 when any one of the cams 74a, 74b, 74c, 74d, 74e, 74f, 74g, 74h, 74i, 74j, 74k, 74m, 74n, 74o and 74p produces a pulse or group of pulses by virtue of one of the associated cams 50 or 52 being in a predetermined position. The cam 74v is also a wiper cam connected in parallel with the cam 74r to render the section of the coding switch 35 above the insulator 77a effective. These cams 74 are connected by means of a conductor 79 to the terminal strip 67 on the recorder 32.

Since it is desirable to know which wave signal receiver produces a particular record on the recording element 38 when the tuning condition of a plurality of receivers is recorded on a single element 38 as indicated in Fig. 6 of the drawings, the cam 74q having a single contact portion in an angular position of the shaft 77 just ahead of the first of the four angular positions referred to above for the direction of rotation of the shaft 77 indicated by the arrow in Fig. 1c of the drawings is provided, so as to produce a code pulse once per minute indicating that a particular receiver is turned on. This code pulse for receiver 25 with cam 74q as indicated would appear in the record position 3 in Fig. 21 of the drawings designated R-1. If the tuning conditions of additional radios such as Radio 2 and Radio 3 were also recorded on element 38, then each of these receivers would have a code commutator switch in which the cam 74q would produce code marks in positions nine and fifteen of the element 38. The contact 73 associated with the cam 74q is connected to the conductor 64e mentioned above. If no code mark is produced on the element 38 by electrical contact of cam 74q with its associated contact 73, then wave signal receiver 25 is either turned off or used as a phonograph which latter condition by virtue of switch 66 is recorded just as if the receiver were turned off. If no code mark appeared in any of the four coding positions for Radio 1 (assumed to be receiver 25) referred to above and yet a code mark appeared in each cycle in position three designated as R-1, then this would be an indication that the receiver 25 was tuned to a station other than the fifteen provided for with the position switch 34, generally referred to as "all others" listening. If the record indicates such "all others" listening for substantial periods of time, then it is apparent that either additional cams should be provided on the position switch 34 and code commutator switch 35 or the existing cams modified to accommodate some other transmitting stations which are listened to frequently.

The cam 74s is designated as the frequency modulation cam and is provided in order to produce an indication on the record receiving element that frequency modulation listening is involved whereby the code pattern will be representative of one of the stations listened to in the frequency modulation and television group rather than in the standard broadcast group. This cam is on the section of shaft 77 electrically isolated from the cams 74a to 74r. The contact 73 associated with the cam 74s is connected by the conductors 69 and 64c directly to the wiper contact cam 51 of the position switch 34 which is in the frequency modulation group of cams. The cam 74s is indicated as having a raised contact portion in a position immediately following the position of the last of the four angular code positions utilized in the coding cams 74a to 74p for the indicated direction of rotation of the shaft 77 so as to produce a record indication in the eighth position on element 38 in Fig. 6 designated as FM.

As will become apparent from the following description the motor 78 is continuously energized whether or not the wave signal receiver 25 is in use and consequently the code commutator switch 35 is rotated at one revolution per minute at all times. In addition to providing the code information indicative of the station to which the receiver 25 is tuned, whether it be a frequency modulation or an amplitude modulation station, certain other information is necessary and desirable on the record receiving element 38 particularly where the mailable magazine is employed in order that a complete and accurate analysis of the listening habits of the wave signal receiver users may be arrived at from the recorded information. Generally the record receiving element 38 is moved in some predetermined manner with respect to time such for example as at constant speed. Under this condition the tuning condition of the receiver 25 will be recorded as a function of time. However, if the recording element is eventually disposed in a mailable magazine which is periodically replaced it is essential that some additional time information be automatically applied which will permit the analysis organization to orientate the recording element with respect to time in any predetermined calendar period. As has been pointed out in the above mentioned Rahmel application, Serial No. 762,962, a very satisfactory means of accomplishing this comprises the employment of the time mark radio 39 associated with the recorder 32, which time mark radio permits a recording of the "sign off" or "sign on" time or both of a particular transmitting station (preferably a clear channel station) located in the same general area as the collaborator's home. Since the "sign off" and "sign on" times vary slightly from day to day and usually very substantially on weekends, a unique time pattern is produced whereby it is readily possible to orientate the record receiving element 38 into any predetermined calendar period.

In addition to recording such time information it is also desirable to provide accurate time information minute by minute for use as a reference in decoding the recorded information. Consequently the cams 74t and 74u are provided which are respectively designated as the time mark radio cam, TMR, and the minute mark cam, MM. The minute mark cam 74u causes the production of the marks 80 in the first position on the record receiving element 38 shown in Fig. 6 of the drawings, while the time mark radio cam 74t causes the production of a record indication in the second position on element 38 shown in Fig. 6. The raised portion of cams 74u and 74t are so disposed angularly as to be rendered effective to produce successive code pulses ahead of any of the other cams 74 during the coding cycles which are of one minute duration and continuously reoccur. A record is continuously produced whenever the time mark radio 39 receives a carrier from the transmitter to which it is tuned and the critical time information designated at 81 in Fig. 21 of the drawings is the "sign on" time when the particular transmitter to which the time mark radio is tuned comes back on the air. The contact 73 associated with the cam 74t is connected by means of a conductor 84 with the time mark radio 39 through the terminal strip 67 on the recorder 32. Similarly, the contact 73 associated with the cam 74u is connected by means of a conductor 86 to the terminal strip 67 on the recorder 32, and since the contact portion of the contact 74u engages with its contact 73 once per minute, a record is produced on the element 38 once per minute by virtue of such operation.

It will be understood that the pulses produced by the coding switch 35 may be applied to control any suitable element capable of producing a record on the movable record receiving element 38. This record receiving element might be a coated tape of some sort upon which a record may be produced by means of a suitable printer bar actuated in dependence upon the pulses to produce the desired code on the tape. It will be understood that the record receiving element might also comprise magnetic wire or tape, facsimile paper, punched tape, photographic film and the like. The specific embodiment is illustrated as employing a record receiving element 38 in the form of photographic film, preferably 16 mm. film. It is believed that using photographic film is preferable to using coated paper tape, for example, with respect to automatic reading capability for at least two reasons; first, because of the greater change in light transmission of exposed film compared to the corresponding change for coated tape; and second, film lends itself more readily to edge guiding than does paper tape. By employing film it will be understood that to obtain a readable record thereon the film must first be devoloped in a conventional manner.

In order to produce a record indication on the film or record receiving element 38 in accordance with the code pattern in the various positions as indicated in Fig. 21 of the drawings, the pulses produced by the continuous rotation of the coding switch 35 at one revolution per minute are preferably employed to energize a suitable lamp generally designated at 95 in Figs. 1*b* and 2 of the drawings thereby to expose the film. For the purpose of insuring long operating life, the lamp 95 is perferably an argon lamp or the like connected in series with a current limiting resistor 96. As illustrated, the argon lamp 95 is connected to the terminal strip 67 across the conductors 64*b* and 79. The electrical circuit for energizing the lamp 95 may readily be traced through the receiver attachment 30 and the code commutator switch 35. For example, assume that the wave signal receiver 25 is turned on (set switch 47 is closed) and the tuning shaft 43 is tuned to a position such that the receiver is receiving station No. 4 in the standard broadcast band whereby the position switch cam 50*d* is in electrical engagement with its contact 54 as shown in Fig. 1*c* of the drawings. Since the wave signal receiver 25 is being operated as a radio in the amplitude modulation or standard broadcast band, the switch 66 is moved to the radio position and the switch 62 is in engagement with its AM contact 62*a*. Under these conditions current from the source flows through the plug connector 46 and the power cord 45 from one terminal of the source through the conductor 64*b* directly to one electrode of the argon lamp 95, then through the current limiting resistor 96, the conductor 79, the contact 73 associated with the cam 74*r*, the shaft 77 below the insulator 77*a*, the cam 74*d* and the contact 73 associated therewith, the conductor 72*d*, the contact 54 associated with the cam 50*d*, the cam 50*d* of the position switch 34, the shaft 48 above the insulator 53, the cam 49 and associated contact 54, conductor 64*d*, switches 62 and 66 and to the other side of the power source through the set switch 47. Whenever the high point on the cam 74*d* engages its associated contact 73, the argon lamp 95 will be energized and this will occur cyclically once per minute as long as the tuning of wave signal receiver 25 remains unchanged. The argon lamp 95 will also be energized whenever the high point of the cam 74*q* engages its stationary contact 73, in view of the circuit in parallel to the one just traced between the shaft 77 and the switch 66 comprising the cam 74*q* and its associated conductor 73 and conductor 64*e*. As long as the wave signal receiver 25 is turned on with the set switch 47 closed and the switch 66 closed, a pulse will be produced once per minute energizing the argon lamp 95 to indicate that the wave signal receiver 25 is turned on. If the wave signal receiver 25 were tuned to an FM channel, another circuit would be completed to energize the lamp 95 whenever the cam 74*s* engaged its associated contact 73.

Since it is desirable for the argon lamp 95 to be energized for the purpose of causing the time mark radio information and minute marks to be produced on the record receiving element 38, whether or not the wave signal receiver 25 is turned on, it is necessary to provide a circuit for the lamp 95 through the cams 74*t* and 74*u* independent of the set switch 47. The circuit for producing the minute marks is completed through the conductor 64*a* which includes the fuse 65, the terminal strip 67 at the recorder 32, the fuse 98, a conductor 99, back to the terminal strip 67, a conductor 99*a*, the conductor 86 to the minute mark cam 74*u*, the shaft 77 above the insulator 77*a*, the cam 74*v*, the conductor 79, resistor 96, argon lamp 95, and the conductor 64*b* back to the other side of the power source. Thus it is apparent that regardless of the condition of the wave signal receiver 25, the argon lamp 95 will be energized once per minute at the instant the cam 74*u* engages its associated contact 73. The circuit for energizing the lamp 95 to record information from the time mark radio whenever the cam 74*t* engages its associated contact 73 and the contacts 100*a* of a relay 100 to be described hereinafter, are closed as shown in Fig. 1*a* of the drawings, may be traced from one side of the power source connected to the plug connector 46 through the conductor 64*a* including the fuse 65, the terminal strip 67, the fuse 98, the conductor 99, the conductor 99*a*, the conductor 86*a* to contacts 100*a* of the relay 100, the conductor 84, the cam 74*t*, the shaft 77 above the insulator 77*a*, the cam 74*v*, the conductor 79, resistor 96, argon lamp 95, and the conductor 64*b* to the other side of the power source connected to plug connector 46.

From the above discussion it will be apparent that the argon lamp 95 is switched on and off several times each minute by virtue of the operation of the code commutator switch 35. In order to prevent any radio interference by virtue of this periodic switching operation a suitable noise suppressor circuit is preferably in the form of capacitors 101 and 102 shown in Fig. 1*b* of the drawings, the former connected across the serially arranged lamp 95 and resistor 96, and the latter connected across the various contacts of the code commutator switch 35 in a manner well understood by those skilled in the art.

For the purpose of causing the argon lamp 95 to expose portions of the film 38 in a desired predetermined manner so the code indications are produced in the correct positions across the record receiving element 38 as shown in Fig. 6 of the drawings, it is necessary to expose predetermined transverse portions of the film 38 in synchronism with the energization of the light source 95. In accordance with the present invention there is provided in the recorder 32 a suitable optical system best shown in Figs. 2 to 5 of the drawings. This optical system extends between the argon light source 95 and the film or record receiving element 38 to expose desired restricted areas of the film to the light source 95. This optical system starting with the portion adjacent the lamp 95 comprises a condensing lens 102, a rotating shutter disk 103, a fixed slit member or target 104, and a projection lens 105. Light from the argon lamp 95 passes through the condensing lens 102, then through a predetermined one of plurality of openings defined in the rotating shutter disk 103, then through a horizontally disposed slit 104*a* in the target 104 and finally through the projection lens 105 to the record receiving element or film 38.

For the purpose of properly correlating the code commutator switch and the rotating shutter disk 103, the latter is also rotated at one revolution per minute by the motor 78 as is clearly shown in Figs. 1*b* and 4 of the drawings where the shaft 77 drives both the cams 74 and the shutter disk 103. In the event that the code commutator switch is associated with the receiver attachment 30 rather than the recorder 32 two identical synchronous motors 78 would be employed, one for driving the shutter disk 103 and one for driving the code commutator switch 35 in synchronism therewith. The slit 104*a* in the target 104 defines the limits of the film area which can be exposed by the light source 95 for a particular position of the film 38 and all positions of the shutter disk 103.

In order to cause light from the source 95 to fall on the correct positions transversely of the film 38 in dependence upon the pulses produced by the code commutator switch 35, the rotating shutter disk 103 is provided with a plurality of elongated openings or slits, twenty-two being specifically shown to correspond with the twenty-two positions indicated on the record receiving element 38 in Fig. 6 of the drawings, designated as **106*a*, 106*b*, 106*c*, 106*d*, 106*e*, 106*f*, 106*g*, 106*h*, 106*i*, 106*j*, 106*k*, 106*m*, 106*n*, 106*o*, 106*p*, 106*q*, 106*r*, 106*s*, 106*t*, 106*u*, 106*v* and 106*w*. These slits are arranged in a spiral around the disk to cause the light to successively move across the film 38 from left to right as viewed in Fig. 6 with clockwise rotation of the disk 103 as viewed in Figs. 2 and 3 and assuming the light source 95 is continuously energized. This shutter disk 103 rotates at one revolution per minute and successively presents the slits 106*a*, 106*b*, 106*c*, etc., in that order along a plane extending between the light source 95 and the film 38 through the slit 104*a* in the target 104. The film 38 preferably moves the width of the image of the slit 104*a* during the time that the rotating shutter disk 103 makes one revolution. Consequently the film is scanned transversely by the spirally arranged slits 106 in the shutter disk 103 and longitudinally by movement of the film 38 through a distance at least the width of the slit 104*a* during this time. It will be apparent that the engagement of the particular contacts of the code commutator switch must be correlated with a corresponding slit 106 in the rotating shutter disk 103** to give the desired record.

Referring now to Fig. 6 of the drawings, it will be apparent that a single radio without any FM band requires seven positions on the film or tape which means that only seven of the slits 106 are required. The slit **106*a* is employed to produce the minute mark on the film and this slit must be in line with the slit 104*a* in the target 104 for the instant of time that the cam 74*u* of the code commutator switch 35 engages its associated contact 73. The slit 106*b* is employed for the time mark radio indication and this slit must be in line with the slit 104*a* in the target 104 during the time that the cam 74*t* of the code commutator switch 35 engages its associated contact 73. The next four slits 106*c*, 106*d*, 106*e* and 106*f* are employed for recording in the four code positions on film 38 the stations to which Radio–1 (receiver 25) is tuned. These slits must be successively effective for light transmission during each cycle as the cams 74*a* to 74*p* assume their four effective angular positions discussed above. In the event that the wave signal receiver 25 being monitored is tunable to frequency modulation channels including television channels the slit 106*g* of the rotatable shutter disk 103 is employed and this slit 106*g* must be in registry with the slit 104*a* of the target 104 when the FM cam 74*s* engages its contact 73. The remaining slits in the rotating shutter disk 104 are employed to expose the additional positions 9 to 22 on the record receiving element 38 shown in Fig. 6 which would be used only if the tuning condition of additional receivers were to be recorded on the single film 38**.

The rotating shutter disk 103 is mounted in a housing for the recorder 32 and is directly driven from the synchronous motor 78 which is also mounted on the housing. The structural elements of the optical system schematically shown in 2 and 4 of the drawings are enclosed in the housing.

In order to be sure that the proper slit 106 is rendered effective simultaneously with the code switch 35 assuming a proper position, it is necessary to be able to see at least a portion of the disk 103 and for this reason the housing is provided with a peep hole through which circumferential markings 112 disposed along the circumference of the rotating shutter disk 103 are visible. These markings 112 are displaced 180 degrees from the associated slits 106 so that when a slit 106 is effectively in registry with the slit **104*a* of the target 104 a corresponding marking 112 is visible through the peep hole. The markings 112 are designated by the same subscript as the corresponding slits 106. The ends of each edge marking 112 are clearly delineated to indicate the position of the corresponding ends of the corresponding slits 106**.

Actually these markings 112 are uniformly spaced in the same manner as the uniformly spaced slits 106, except for the slits **106*a*, 106*x* and 106*y* which are non-uniformly spaced. The slit 106*x* is provided in the event that it is desired to put some additional time information in a portion of position one on film 38 and the slit 106*y* effectively is a large opening extending across the shutter disk 103 for the purpose of examining the entire field across the film 38 during the initial adjustment of the optical system. This large opening 106*y* might also be employed, if desired, for the purpose of indicating power outages. For example, the system might be arranged so that in the event of a power outage the light source 95** might be maintained energized for a period such as two minutes after power is restored whereupon an appropriate record would be produced on the film clearly indicating that such power outage has occurred.

In initially adjusting the optical system with the code commutator switch 35 the field man would see that the particular cam 74 of the coding switch 35 causes the light source 95 to be energized within the period that the ends of the reference marks 112 representative of the corresponding slit 106 are visible through the peep hole. For example, the energization of the light source 95 by engagement of the minute mark cam **74*u* with its associated contact 73 must occur while the reference or calibration mark 112*a* is visible through the peep hole. If this is not the case, an adjustment must be made to insure that light from the source 95 is on when the minute mark slit 106*a* is effective to expose the film 38. This relationship must also be true for the remaining slits 106 and associated cams 74 which can be determined by the reference marks 112** as viewed through the peep hole.

To move the record receiving element 38 in some predetermined manner with respect to time, the recorder 32, as illustrated in the schematic diagram disclosed by the combination of Figs. 1*a*, 1*b* and 1*c*, includes a film drive motor 120 which is drivingly connected by a shaft 121 to a friction drive roller 122 preferably to rotate the latter at one-half revolution per hour thereby to move the film 38 at least the width of the target slit **104*a* described above during one revolution of the shutter disk 103. For purposes which will become apparent from the following description, the motor 120 drives the friction drive roller 122 through a double overrunning clutch schematically indicated at 123. Preferably also the film drive motor 120 operates a cam switch 124 comprising relatively movable contacts 124*a* and 124*b* operated by a cam follower 125 associated with the cam 126 rotatable at one-half revolution per hour. The cam 126 has a short dwell portion or recess 126*a* so as to close the switch 124 (closed position indicated) for a few minutes such as two to three minutes during each two-hour interval. During the remainder of the two-hour interval the switch 124 is open. The switch 124 is employed to render the time mark radio 39** effective for a few minutes during every two-hour period, the purpose of which will become apparent from the description included hereinafter.

The time mark radio 39 forms no part of the present invention and is fully described in the co-pending Rahmel application Serial No. 762,962 referred to above. This time mark radio 39 is a fixed tuned receiver tuned to a particular transmitting station (preferably a clear channel station) located in the same area as the collaborator's home. As illustrated schematically in Fig. 1*a* of the drawings, this fixed tuned receiver or time mark radio 39 comprises an antenna ground circuit 130, a fixed tuned radio frequency amplifier 131, an oscillator modulator unit 132, an intermediate frequency amplifier unit 133, and a detector 134 all connected in tandem in the order named. Whenever the receiver 39 is turned on and the particular transmitting station to which it is always tuned is "on the air" a carrier signal is received by the receiver 39. The carrier portion of this signal is rectified by the detector 134 and appears across a resistor 135 as a direct current voltage. This voltage is applied as a negative bias to the grid of the suitable control tube 136. The plate circuit of the control tube 136 is connected from a source of +B potential 137 through the winding of the relay 100 to ground 138 through suitable grounding resistors 139 and 140.

The fixed tuned receiver 39 is illustrated as having a power supply section generally designated at 141, comprising a primary winding 144 of a transformer 143 connected by suitable conductors 145 and 146 to the source of alternating potential supplied to the recorder 32 through the link 31 from the receiver attachment 30. The conductors 145 and 146 are connected to the terminal strip 67*a* of the time mark radio 39. The conductors leading away from the terminal strip 67*a* and connected to the conductors 145 and 146 are also designated by the same reference numerals. Power is supplied to the primary winding 144 of the time mark radio 39 through any one of a plurality of parallel connected circuits. As illustrated, one side of the primary winding 144 is connected through the conductor 145, a conductor 147 and the conductor 64*b* directly to one side of the power supply to which the plug connector 46 of the monitored receiver 25 is connected. The other terminal of the primary winding 144 is connected to the other side of the alternating current circuit through one of the following three circuit paths: (*a*) a current path through a conductor 149, the contacts 150*a* of a thermal relay 150, the conductor 152, the conductor 153, a portion of the conductor 99, the fuse 98 and the conductor 64*a*; (*b*) a current path through the conductor 146, through a normally open cover lock switch 160, through a conductor 154, the conductor 153, a portion of the conductor 99, the fuse 98, and the conductor 64*a*; or (*c*) a current path through the conductor 146, the conductor 161, the cam switch 124, through a conductor 162, the conductor 154, the conductor 153, a portion of the conductor 99, the fuse 98, and the conductor 64*a*. The purpose of these parallel arranged circuits will become apparent as the following description proceeds.

The cam switch 124 is primarily for the purpose of permitting the fixed tuned receiver 39 to be turned off for substantial periods of time in order to increase the tube life of this receiver. With this arrangement the cam switch 124 turns on the time mark radio 139 for two or three minutes during each two-hour period. Actually the receiver 39 is illustrated as recording only the "sign on" time of the transmitter to which it is always tuned rather than the "sign off" time for reasons which were fully brought out in the above mentioned co-pending Rahmel application, Serial No. 762,962. Accordingly it is necessary in the event that the receiver 39 is turned on during one of these two or three minute intervals in each two-hour period and no signal is received from the station to which it is tuned that this receiver 39 remain turned on until the "sign on" time of this transmitting station so that a record indication of such "sign on" time may be made.

To this end the relay 100, which is shown in the position when the time mark radio 39 is either turned off or no carrier is received (actually the latter must be true in the schematic illustration since the switch 124 is shown in a closed position), is provided with a set of contacts 100*b* which are opened when the relay is de-energized or in other words when the time mark radio is off or no carrier is received. If the time mark radio 39 is on during one of the two or three minute intervals during each two-hour period and no carrier is received no negative bias is applied to the grid of the control tube 136 and consequently the winding of the relay 100 is energized so as to open the contacts 100*a* and close the contacts 100*b*. When the contacts 100*b* are closed a resistor 170 associated with the thermal relay 150 is connected to the source 137 of +B potential so that after a short time delay the thermal relay 150 closes its contacts 150*a*. This completes one of the parallel energization circuits for the time mark radio 39 whereupon it will remain energized even though the cam switch 124 shortly thereafter opens the circuit through contacts 124*a* and 124*b*. The relay 100 will then remain energized until the "sign on" time of the transmitter to which the receiver 39 is tuned whereupon the receipt of a carrier signal will de-energize the relay 100.

The reason the thermal relay 150 is provided in this parallel circuit for energizing the primary winding 144 of the transformer 143 is to prevent momentary lapses in carrier from the transmitter to which the receiver 39 is tuned from causing the parallel circuit to be rendered effective through the closure of the contacts 100*b*. The third circuit for energizing the primary winding 144 is controlled by the cover switch 160 which is clearly shown in Fig. 1*b* of the drawings and which is closed when a cover or housing of the recorder 32 is removed. Removal of this cover and consequent closure of the switch 160 automatically energizes the time mark radio to permit the field man to make the necessary calibrations without waiting for the cam switch 124, which may not close for almost two hours, to be energized.

The schematic diagram of the system illustrated in Figs. 1*a*, 1*b* and 1*c* also includes a transfer switch 172 shown in Fig. 1*b* of the drawings which is adapted to engage either one of two contacts 172*a* and 172*b*. This transfer switch is actuated in dependence upon whether or not the magazine 36 is disposed in the magazine receptacle of the recorder 32 or not. When the magazine 36 is in the magazine receptacle, the switch 172 is actuated to engage the contact 172*a* to complete the energization circuit for the film drive motor 120 from the conductors 64*a* and 64*b*. In other words, it is undesirable to advance the film or record receiving element 38 when the magazine 36 for receiving the exposed film is not in position. When the magazine 36 is not in its film receiving position the switch 172 engages its contact 172*b* thereby transferring the power supplied to the motor 120 to a suitable audible signal means generally designated at 173 which produces an audible signal whenever the exposed magazine 36 is removed to encourage the collaborator to immediately replace it with a new magazine.

In view of the detailed description included above the operation of the system and apparatus of the present invention will be understood by those skilled in the art. The analysis organization will initially install the equipment in association with wave signal receivers located in the homes of collaborators. The apparatus associated directly with the receiver is relatively small so as to be unnoticeable. The recording apparatus will produce a record in binary code of the type shown in Fig. 21 whereby information with respect to the listening habits of a plurality of wave signal receiver users may be recorded on a single record receiving element. Actually the typical record shown in Fig. 21 is the record after the film has been developed and this record lends itself very well to automatic decoding dependent upon the light transmission through the film 38. It will be understood that the analysis organization can develop such film in a simple and well understood manner just as movie film is now developed in commercial establishments throughout the country by means of a continuous process.

While there has been shown and described a particular embodiment of the present invention, it is not desired that the invention be limited to the construction shown and described, for it will, of course, be obvious to those skilled in the art, that changes and modifications may be made without departing from the invention and it is, therefore, aimed in the appended claims to cover all such changes and modifications as fall within the true spirit and scope of this invention.

What is claimed as new and desired to be secured by Letters Patent of the United States is:

1. In combination, a source of light, means for supporting a light sensitive element spaced from said source, means for moving said light sensitive element, a rotatable disk of opaque material interposed between said element and said source, means for rotating said disk in a predetermined manner, means defining a plurality of narrow openings in said disk arranged in substantially a one turn spiral around the axis of rotation of said disk whereby light from said source is confined to a small fraction of the transverse extent of said element and caused to move transversely of said light sensitive element as different ones of said openings are rendered effective, and power outage indicating means including one opening defined in said disk through which light from said source may reach the entire transverse extent of said film.

2. In a device for recording the transmitting stations to which one or more wave signal receivers are tuned comprising, in combination, a source of light, means for supporting a light sensitive element spaced from said source, synchronous motor means for moving said element at a constant speed, a rotatable disk of opaque material interposed between said element and said source, means for rotating said disk in a predetermined manner, means defining a plurality of narrow openings in said disk arranged in substantially a one turn spiral around the axis of rotation of said disk whereby light from said source is confined to a small fraction of the transverse extent of said element and caused to move transversely of said light sensitive element as different ones of said openings are rendered effective, means defining one opening in said disk through which light from said source may reach the entire transverse extent of said film, and means utilizing said source and said one opening for indicating on said element failure of operation of said synchronous motor means.

3. In combination, a source of light, synchronous means for controlling the energization of said source, means for supporting a light sensitive element spaced from said source, a rotatable disk of opaque material interposed between said element and said source, said synchronous means also rotating said disk in a predetermined manner, means defining a plurality of narrow openings in said disk arranged in substantially a one turn spiral around the axis of rotation of said disk whereby light from said source is confined to a small fraction of the transverse extent of said element and is caused to move transversely of said light sensitive element as different ones of said openings are rendered effective, means defining one opening in said disk through which light from said source may reach the entire transverse extent of said film, means on said disk representative of different ones of said openings and including means for indicating the limits of said openings, and means for viewing said last mentioned means for initially adjusting the relative position of the openings in said disk relative the operation of the synchronous means for controlling the energization of said source.

References Cited in the file of this patent

UNITED STATES PATENTS

| | | |
|---|---|---|
| 1,768,288 | Mohr | June 24, 1930 |
| 1,838,537 | Dauvillier | Dec. 29, 1931 |
| 2,120,703 | Janes | June 14, 1938 |
| 2,169,011 | Wengel | Aug. 8, 1939 |
| 2,184,161 | Stockbarger et al. | Dec 19, 1939 |
| 2,358,678 | Young | Sept. 19, 1944 |
| 2,628,539 | Neergaard | Feb. 17, 1953 |

FOREIGN PATENTS

| | | |
|---|---|---|
| 430,900 | Great Britain | Sept. 25, 1934 |
| 770,509 | France | Sept. 15, 1934 |